Aug. 29, 1972 G. J. GARRIS 3,687,622
HIGH PRESSURE PURIFICATION OF HYDROGEN FLUORIDE
Filed Nov. 30, 1970
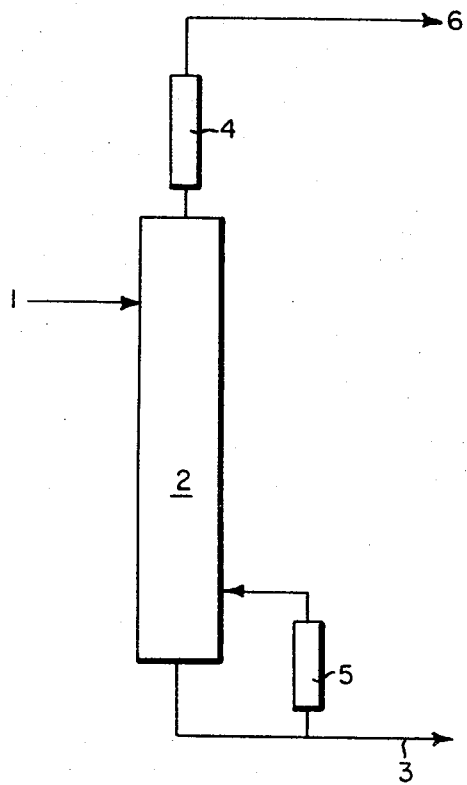
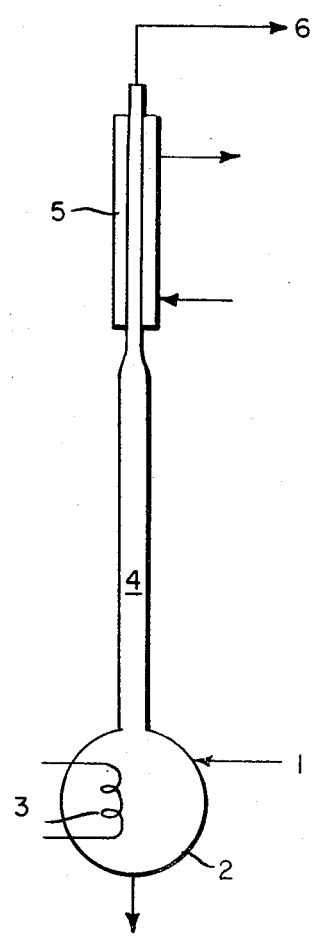
INVENTOR
GEORGE J. GARRIS
BY *John R. Powell*
ATTORNEY

United States Patent Office 3,687,622
Patented Aug. 29, 1972

3,687,622
HIGH PRESSURE PURIFICATION OF HYDROGEN FLUORIDE
George James Garris, Deer Park, Tex., assignor to E. I. du Pont de Nemours and Company, Wilmington, Del.
Continuation-in-part of application Ser. No. 851,349, Aug. 19, 1969. This application Nov. 30, 1970, Ser. No. 93,892
Int. Cl. C01b 7/22
U.S. Cl. 423—488         5 Claims

ABSTRACT OF THE DISCLOSURE

Anhydrous hydrogen fluoride containing less than about 3000 parts per billion of arsenic is produced by distilling industrial grade or crude hydrogen fluoride at a pressure greater than 115 p.s.i.a. At pressures above 165 p.s.i.a., the resulting hydrogen fluoride contains less than about 100 parts per billion of arsenic.

CROSS REFERENCE TO RELATED APPLICATION

This application is a continuation-in-part of my co-pending application Ser. No. 851,349, filed Aug. 19, 1969, now abandoned.

BACKGROUND OF THE INVENTION

This invention relates to purification of hydrogen fluoride and more particularly is directed to a process for purifying hydrogen fluoride by removing arsenic through distillation.

Within the last few years the demand for anhydrous hydrogen fluoride of very high purity has increased tremendously. The exploitation of nuclear energy and the expansion of the electronic metals industry have contributed markedly to the demand for pure hydrogen fluoride. Thus, hydrogen fluoride is used in the preparation of uranium, zirconium, and beryllium fluoride which are of primary importance in the harnessing of nuclear energy, especially in the production of very pure uranium oxide for reactors.

Very pure hydrogen fluoride is also employed in the electronic metals industry in several ways. It is used in analytical procedures for the analysis of trace amounts of arsenic semiconductor grade silicon metal and in the silicon containing compounds, such as trichlorosilane, silicon tetrachloride and monosilane, used as raw material for the semiconductor grade silicon metal. Hydrogen fluoride is also used as a cleaning agent and etching agent on the finished silicon electronic devices, especially as a cleaner in the production of high purity epitaxial silicon.

Hydrogen fluoride is made commercially by reaction of fluorspar with concentrated sulfuric acid. The crude product is usually distilled at about 40 to 100 p.s.i.a. through two columns, one removing the high-boiling and the other one the low-boiling impurities. This industrial grade hydrogen fluoride contains, however, a major proportion of the arsenic originally present in the fluorspar.

In the analysis of the arsenic content of materials such as high purity silicon, one often deals with arsenic levels of less than about 100 parts per billion by weight. The abbreviation p.p.b. will be used hereinafter to mean parts per billion by weight or parts per $1.0 \times 10^9$ parts by weight. It is apparent that the hydrofluoric acid reagent used in analysis and purification of these materials must be substantially free of arsenic, and contain less than 100 p.p.b. arsenic to avoid contaminating the material involved.

The distillation of hydrogen fluoride to prepare a pure product is well known in the art. However, such distillations are ordinarily carried out at a pressure between 35 and 100 p.s.i.a. to utilize water as a coolant thus permitting the most economical operation.

As distillation at pressures between 35 and 100 p.s.i.a. does not separate arsenic from the hydrogen fluoride, separate purification steps have been required to remove this impurity. Representative of such purification steps is the process disclosed in the U.S. Pat. No. 3,166,379 which requires oxidation or halogenation of the arsenic to facilitate its removal by distillation at atmospheric pressure.

SUMMARY OF THE INVENTION

In summary, this invention relates to a process for producing high purity anhydrous hydrogen fluoride, containing less than about 3000 p.p.b. arsenic, from arsenic-containing hydrogen fluoride by distilling the arsenic-containing hydrogen fluoride at a pressure greater than 115 p.s.i.a. and removing the high purity anhydrous hydrogen fluoride as the bottoms product. When the distillation is carried out above 165 p.s.i.a., the product contains less than 100 p.p.b. of arsenic.

This process provides a convenient, simple, and economically attractive procedure for producing high purity anhydrous hydrogen fluoride containing acceptable levels of arsenic.

BRIEF DESCRIPTION OF THE DRAWINGS

FIG. 1 is a diagram which illustrates continuous operation of the process of this invention.

FIG. 2 is a diagram which illustrates batch operation of the process of this invention.

DESCRIPTION OF THE INVENTION

By the process of this invention, high purity anhydrous hydrogen fluoride can be produced either continuously or batchwise. In the continuous process, schematically illustrated in FIG. 1, impure anhydrous hydrogen fluoride 1 is fed to a distillation column 2 operated at a pressure greater than 115 p.s.i.a., and the high purity hydrogen fluoride 3 is removed from the bottom of the column 3. The column is operated at substantially total reflux with the hydrogen fluoride returned to the column from a dephlegmator 4 and allowing the low boiling impurity arsenic to be removed overhead as a vapor. A calandria 5 provides boil-up for the distillation column. The arsenic is wasted through the vent 6.

FIG. 2 is a diagram which illustrates a batch process of this invention. Impure hydrogen fluoride 1 is charged to the still 2 batchwise. Batch distillation is continued until the impurity concentration of the still drops to a selected level. A heating coil 3 supplies the vapor boil-up to a distillation column 4. High purity HF is produced as a high boiler in the reboiler 2 by removing the arsenic overhead as a vapor. A dephlegmator 5 returns the hydrogen fluoride to the column supplying reflux and allowing the arsenic to be removed through vent 6 as a vapor.

The feedstock used in the process of the present invention can be either the industrial grade hydrogen fluoride or crude hydrogen fluoride obtained by reaction of calcium fluoride with concentrated sulfuric acid. The arsenic content of this material will vary, of course, according to the arsenic content of the starting fluorspar. While in the actual experiments described below hydrogen fluoride containing 72,000 p.p.b. of arsenic was used, it will be readily apparent that higher concentrations of arsenic could be present in the hydrogen fluoride feed. Crude hydrogen fluoride containing 200,000 p.p.b. or more of arsenic can be used in the process of the present invention.

Arsenic contents referred to herein are determined by analysis according to the "Gutzeit" method for arsenic, as described in Freeman, N.H., ed. Standard Methods of Chemical Analysis (September 1963), I, 118–124, and will be understood to possibly reflect antimony content as well as arsenic.

In the batch process, the distilling column usually will have about 20–80 theoretical plates. The reflux ratio is maintained at about 0.01 to 0.000001, and the reflux period is about 6–24 hours. The upper limit of the operable pressures is approximately 941 p.s.i.a., which is the critical pressure of pure hydrogen fluoride. The reflux temperature within the 115–941 p.s.i.a. pressure range is 366 to 461° K.

The preferred operating pressures are 165–200 p.s.i.a., and the operating temperature within this range varies from 377 to 385° K. The preferred reflux ratio is 0.01 to 0.0001, and the reflux period is 6–10 hours.

In the continuous process, it is advisable to use distilling columns having a larger number of theoretical plates, 50–100 plates being quite adequate. Within the pressure range of 165–200 p.s.i.a., the reflux ratio is maintained at 0.01 to 0.0001, and the operating temperatures vary from 377 to 385° K.

Because of the relatively high distillation temperatures in the process of the present invention, water is conveniently used as the cooling medium in the dephlegmators.

This invention is now illustrated by the following example wherein parts and percentages are by weight.

EXAMPLE 1

Using the apparatus shown in FIG. 2 the column is a 0.75 inch inside diameter 316 stainless steel tube packed with 40 inches of 0.16 inch 316 stainless steel protruded metal packing. One thousand grams of hydrogen fluoride containing 72,000 p.p.b. arsenic is charged to the still. The still is then heated to give a boil-up rate of approximately 25 grams per minute. Column pressure is controlled at 165 p.s.i.a. and the reboiler temperature is 382.0° K. The column, which has 40 theoretical plates, is operated at a reflux ratio of 0.0005 for six hours. A liquid sample taken from the reboiler contains 100 p.p.b. arsenic as measured by the Gutzeit method. Distilling in a similar manner but varying the operating pressure the following results are obtained:

| Operating pressure, p.s.i.a. | Feed composition, p.p.b. arsenic | Reboiler composition, p.p.b. arsenic | Reboiler temperature, ° K. |
| --- | --- | --- | --- |
| 115 | 72,000 | 3,000 | 366.0 |
| 130 | 72,000 | 1,000 | 370.6 |

The operating conditions for carrying out the process of this invention are not narrowly critical except as regards the pressure limitations. Of course pressures in excess of 250 p.s.i.a. will seldom be practical. The overhead temperature will vary with the impurity concentration of the overhead product and will range between the boiling point of hydrogen fluoride and the boiling point of the impurities present at the pressure of the distillation. Because a hydrogen fluoride product containing less than 100 p.p.b. arsenic is often preferred for the uses mentioned above, it is preferred to operate the process of this invention at pressures above 165 p.s.i.a., as such operation produces hydrogen fluoride containing less than about 100 p.p.b. arsenic.

It will be readily apparent to one skilled in the art that the actual parameters for each distillation will vary according to the arsenic concentration of the feedstock. For a feedstock containing a higher amount of arsenic than the feedstock used in the above examples it may be advisable to use a distilling column having a larger number of theoretical plates. Alternatively, if the distilling equipment cannot be readily changed, it is possible to obtain hydrogen fluoride having arsenic concentration within the same low limits by either increasing the reflux ratio or the reflux time. The choice of the proper set of conditions within the scope of this process can be easily made by an engineer familiar with plant operation.

I claim:

1. In the process for producing high purity anhydrous hydrogen fluoride containing less than about 3000 p.p.b. of arsenic by the distillation of impure anhydrous hydrogen fluoride, said hydrogen fluoride containing up to about 200,0000 p.p.b. of arsenic, the improvement of conducting said distillation at a pressure greater than 115 p.s.i.a. to remove arsenic overhead and recovering the high purity anhydrous hydrogen fluoride as the bottoms product.

2. The process of claim 1 wherein the pressure of distillation is greater than 165 p.s.i.a. and the high purity anhydrous hydrogen fluoride product contains less than 100 p.p.b. of arsenic.

3. The process of claim 1 being conducted in a batchwise manner in a distillation column of 20 to 80 theoretical plates at a pressure between above 115 and 941 p.s.i.a., a reflux temperature of 366° to 461° K., a reflux period of 6 to 24 hours, and a reflux ratio of 0.01 to 0.000001.

4. The process of claim 1 being conducted in a batchwise manner in a distillation column of 20 to 80 theoretical plates at a pressure between 165–200 p.s.i.a., a reflux temperature of 377° to 385° K., a reflux period of 6 to 10 hours, and a reflux ratio of 0.01 to 0.0001.

5. The process of claim 1 being conducted in a continuous manner in a distillation column of 50 to 100 theoretical plates, at a pressure between 165 and 200 p.s.i.a., a reflux temperature of 377° to 385° K., and a reflux ratio of 0.01 to 0.0001.

References Cited

UNITED STATES PATENTS

| 3,004,829 | 10/1961 | Boyle et al. | 23—153 |
| 3,166,379 | 1/1965 | Bradley et al. | 23—153 |
| 3,167,391 | 1/1965 | Swinehart | 23—153 |

FOREIGN PATENTS

| 139,306 | 1961 | U.S.S.R. | 23—15ᶠ |

EDWARD STERN, Primary Examiner

U.S. Cl. X.R.

203—91, 93